No. 758,556. PATENTED APR. 26, 1904.
T. W. MORAN.
FLEXIBLE JOINT.
APPLICATION FILED JAN. 18, 1904.
NO MODEL.
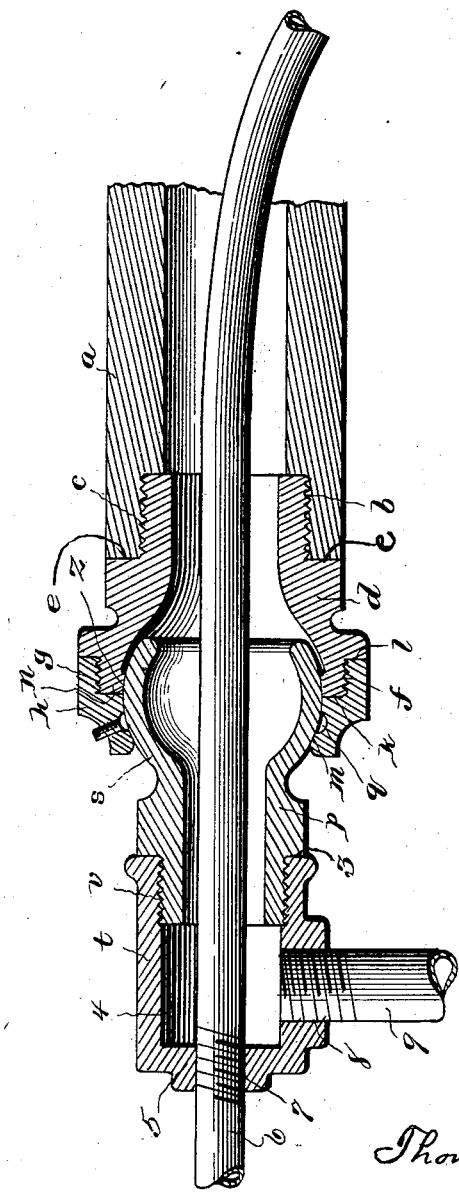
Witnesses
R. A. Boswell,
George M. Anderson.
Inventor
Thomas W. Moran
By E. W. Anderson,
his Attorney No. 758,556. Patented April 26, 1904.

UNITED STATES PATENT OFFICE.

THOMAS WILLIAM MORAN, OF LOUISVILLE, KENTUCKY, ASSIGNOR TO MORAN FLEXIBLE STEAM JOINT COMPANY, OF LOUISVILLE, KENTUCKY, A CORPORATION OF KENTUCKY.

FLEXIBLE JOINT.

SPECIFICATION forming part of Letters Patent No. 758,556, dated April 26, 1904.

Application filed January 18, 1904. Serial No. 189,490. (No model.)

*To all whom it may concern:*

Be it known that I, THOMAS WILLIAM MORAN, a citizen of the United States, and a resident of Louisville, in the county of Jefferson and State of Kentucky, have made a certain new and useful Invention in Flexible Joints for Laundry-Mangles or other Revolving Cylinders; and I declare the following to be a full, clear, and exact description of the same, such as will enable others skilled in the art to which it appertains to make and use the invention, reference being had to the accompanying drawing, and to letters and figures of reference marked thereon, which forms a part of this specification.

The figure is a sectional view showing the invention as applied to a laundry-mangle.

The invention relates to flexible joints for the hot roller-cylinders of laundry-mangles and for other purposes; and it consists in the novel construction and combinations of parts, as hereinafter set forth.

In the accompanying drawing, illustrating the invention in its application to a laundry-mangle, the letter $a$ designates the hollow rotary cylinder or roller, which is designed to be heated by steam, hot water, or other material passing through a supply-pipe. The cylinder is provided at its end with a thread $b$, adapted to engage the thread $c$ of the rotary member $d$ of the joint, which is formed with a shoulder $e$, designed to abut against the end of the roller in a steam-tight manner. This joint member $d$ is provided at its outer end with an exterior thread $f$, designed to engage the interior thread $g$ of the annularly-concave band or ring $h$. An interior annular shoulder $k$ of the band $h$ engages the end of the member $d$, and an exterior annular shoulder $l$ of the latter engages the adjacent end of the band $h$. The spherical concave bearing of the band is indicated at $m$. This concave bearing, with the concave bearing $z$ of the interior annular marginal rib $n$ of the part $d$, forms one even or continuous concave bearing-surface.

The member $p$ of the joint is not designed to rotate. It is formed with a spherically-convex extension at $s$, which is designed to engage the concave bearings $m$ and $z$, and as these bearings are on opposite sides of such extension the latter, while forming a free spherical bearing for rotation in any direction, is held in position so that it cannot slip endwise relatively to the rotary member of the joint. The outer end of the member $p$ is provided with a cap-piece $t$, which is threaded at $v$ to engage the end thread of the joint member, which is formed with a shoulder 3 to engage the adjacent end of the cap and provide a steam-tight joint. The threaded end of this member is extended in hollow form, as shown at 4, and the cap is also extended, as indicated at 5, to provide a free way for the siphon or waste pipe 6, which is engaged by a threaded opening 7 in the end of the cap. The lower portion of this cap is also provided with a threaded opening 8 for the junction of the end of a supply-pipe 9, designed to admit steam, hot water, or other material into the cylinder. Around the inside of the concave bearing of the band is formed an annular groove $q$, which communicates with the oil-cup and is designed to promote lubrication of the parts to facilitate the free movement of the joint.

It will be apparent that the spherical part $s$ forms the journal-bearing of the cylinder $a$, the axis of which as said cylinder is operated in different angular positions always coincides with the center of figure of said spherical bearing. The elongation of the parts connected with the spherical journal member of the joint is designed to allow for the length of the siphon-pipe 6 within and serves to prevent this pipe from interfering with the movements of the cylinder. The siphon-pipe is bent at its end within the cylinder so that it will nearly touch the interior thereof, while it is not in actual contact. In this way it is designed to take out the waste which would hinder the heating action. In this way it is designed to provide a tight revolving joint without the aid of springs, jackets, or packings.

Having thus described my invention, what I claim as new, and desire to secure by Letters Patent, is—

The flexible rotary joint, consisting of the rotary member having a shouldered portion for attachment to a cylinder, a spherical journal member, an annular concave bearing-band connecting the members, said spherical journal member having an extension, and a cap for the connection of the waste-pipe and the supply, substantially as specified.

In testimony whereof I affix my signature in presence of two witnesses.

THOMAS WILLIAM MORAN.

Witnesses:
G. S. BRIDGES,
L. W. BOTTS.